US006986465B2

(12) United States Patent
Kiekhaefer

(10) Patent No.: US 6,986,465 B2
(45) Date of Patent: *Jan. 17, 2006

(54) TRANSPARENT/TRANSLUCENT FINANCIAL TRANSACTION CARD

(75) Inventor: John H. Kiekhaefer, Bloomingdale, IL (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/735,940

(22) Filed: Dec. 15, 2003

(65) Prior Publication Data

US 2004/0124245 A1    Jul. 1, 2004

Related U.S. Application Data

(63) Continuation of application No. 10/339,814, filed on Jan. 10, 2003, now Pat. No. 6,705,530, which is a continuation of application No. 09/675,912, filed on Sep. 29, 2000, now Pat. No. 6,732,936, which is a continuation-in-part of application No. 09/449,251, filed on Nov. 24, 1999, now Pat. No. 6,296,188, which is a continuation-in-part of application No. 09/411,359, filed on Oct. 1, 1999, now Pat. No. 6,290,137.

(51) Int. Cl.
*G06K 19/00* (2006.01)

(52) U.S. Cl. .......................................... 235/487; 902/25

(58) Field of Classification Search ................ 235/487, 235/488, 490, 491, 493, 494, 468; 902/25, 902/26; 283/92
See application file for complete search history.

(56) References Cited

U.S. PATENT DOCUMENTS

| D61,466 S | 9/1922 | Foltz |
| 3,536,894 A | 10/1970 | Travioli ................... 235/468 X |
| 3,553,435 A | 1/1971 | Pike ......................... 235/61.11 |
| 3,566,120 A | 2/1971 | Lane, Jr. ..................... 250/83.3 |
| 3,573,731 A | 4/1971 | Schwend |
| 3,725,647 A | 4/1973 | Retzky ................. 235/61.12 R |
| 3,763,356 A | 10/1973 | Berler ................. 235/61.21 N |
| 3,829,662 A | 8/1974 | Furahashi |
| 3,836,754 A | 9/1974 | Toye et al. .......... 235/61.12 N |
| 3,838,252 A | 9/1974 | Hynes et al. |
| 3,873,813 A | 3/1975 | Lahr et al. |
| 3,894,756 A | 7/1975 | Ward |
| 3,919,447 A | 11/1975 | Kilmer, Jr. et al. ......... 428/138 |
| 3,955,295 A | 5/1976 | Mayer |

(Continued)

FOREIGN PATENT DOCUMENTS

CH    689 680 A5    8/1999

(Continued)

OTHER PUBLICATIONS

Specimen of credit card offered for sale at least as early as Feb., 1974.

(Continued)

*Primary Examiner*—Jared J. Fureman
(74) *Attorney, Agent, or Firm*—McDermott Will & Emery LLP

(57) ABSTRACT

A financial transaction card is transparent or translucent to human viewing yet detectable by automated card processing equipment. The card includes a substantially planar material sheet having upper and lower surfaces bounded by a continuous peripheral edge. The material sheet has one or more areas that are at least minimally transparent or translucent to human viewing. A filter associated with at least one of the areas provides sufficient opacity to light used by card sensors in the automated card processing equipment to render the card detectable.

20 Claims, 7 Drawing Sheets

U.S. PATENT DOCUMENTS

| | | | |
|---|---|---|---|
| 3,987,725 A | 10/1976 | Scantlin | 101/128.4 |
| 4,044,231 A | 8/1977 | Beck et al. | |
| 4,058,839 A | 11/1977 | Darjany | |
| 4,119,361 A | 10/1978 | Greenaway | |
| 4,202,491 A | 5/1980 | Suzuki | |
| 4,361,757 A | 11/1982 | Ehrat | |
| D270,548 S | 9/1983 | Rimer | |
| 4,436,991 A | 3/1984 | Albert et al. | 235/468 |
| 4,504,084 A | 3/1985 | Jauch | |
| 4,519,155 A | 5/1985 | Gallagher et al. | 40/625 |
| D280,214 S | 8/1985 | Opel | |
| 4,538,059 A | 8/1985 | Rudland | |
| 4,544,836 A | 10/1985 | Galvin et al. | 235/487 |
| 4,547,002 A | 10/1985 | Colgate, Jr. | |
| 4,563,024 A | 1/1986 | Blyth | |
| 4,583,766 A | 4/1986 | Wessel | |
| 4,593,936 A | 6/1986 | Opel | |
| 4,597,814 A | 7/1986 | Colgate, Jr. | |
| 4,641,017 A | 2/1987 | Lopata | |
| 4,672,021 A | 6/1987 | Blumel et al. | |
| 4,684,795 A | 8/1987 | Colgate, Jr. | |
| 4,692,394 A | 9/1987 | Drexler | |
| 4,694,148 A | 9/1987 | Diekeimper et al. | 235/468 |
| 4,697,073 A | 9/1987 | Hara | |
| 4,711,690 A | 12/1987 | Haghiri-Tehrani | |
| 4,779,898 A | 10/1988 | Berning et al. | |
| 4,794,142 A | 12/1988 | Alberts et al. | |
| 4,795,894 A | 1/1989 | Sugimoto et al. | |
| 4,837,134 A | 6/1989 | Bouldin et al. | 430/445 |
| 4,852,911 A | 8/1989 | Hoppe | |
| 4,863,819 A | 9/1989 | Drexler et al. | |
| 4,889,366 A | 12/1989 | Fabbiani | |
| 4,950,877 A | 8/1990 | Kurihara et al. | 235/480 |
| D310,386 S | 9/1990 | Michels et al. | |
| 5,005,873 A | 4/1991 | West | 283/92 |
| 5,010,243 A | 4/1991 | Fukushima et al. | |
| 5,106,125 A | 4/1992 | Antes | |
| 5,111,033 A | 5/1992 | Fujita et al. | |
| 5,142,383 A | 8/1992 | Mallik | |
| 5,217,844 A | 6/1993 | Fukushima et al. | |
| 5,241,165 A | 8/1993 | Drexler | 235/488 |
| 5,251,937 A | 10/1993 | Ojster | |
| 5,256,473 A | 10/1993 | Kotani et al. | |
| 5,272,326 A | 12/1993 | Fujita et al. | |
| 5,300,764 A | 4/1994 | Hoshino et al. | 235/487 |
| 5,304,789 A | 4/1994 | Lob et al. | |
| 5,351,142 A | 9/1994 | Cueli | |
| 5,355,411 A | 10/1994 | MacDonald | |
| 5,383,687 A | 1/1995 | Suess et al. | |
| 5,407,893 A | 4/1995 | Koshizuka et al. | |
| 5,410,142 A | 4/1995 | Tsuboi et al. | 235/488 |
| 5,434,404 A | 7/1995 | Liu et al. | 235/475 |
| 5,514,860 A | 5/1996 | Berson | |
| 5,516,153 A | 5/1996 | Kaule | |
| 5,518,810 A | 5/1996 | Nishihara et al. | 428/328 |
| 5,608,203 A | 3/1997 | Finkelstein et al. | |
| 5,614,289 A * | 3/1997 | Kobayashi et al. | 428/195.1 |
| D384,971 S | 10/1997 | Kawan | |
| 5,697,649 A | 12/1997 | Dames et al. | |
| 5,700,037 A | 12/1997 | Keller | 283/107 |
| 5,720,500 A | 2/1998 | Okazaki et al. | |
| 5,786,587 A | 7/1998 | Colgate, Jr. | |
| 5,789,733 A | 8/1998 | Jachimowicz et al. | |
| 5,808,758 A | 9/1998 | Solmsdorf | |
| 5,856,048 A | 1/1999 | Tahara et al. | |
| 5,856,661 A | 1/1999 | Finkelstein et al. | 235/487 |
| 5,857,709 A | 1/1999 | Chock | |
| D406,861 S | 3/1999 | Leedy, Jr. | D19/10 |
| D408,054 S | 4/1999 | Leedy, Jr. | |
| 5,900,954 A | 5/1999 | Katz et al. | |
| 5,928,788 A | 7/1999 | Riedl | |
| 5,932,870 A | 8/1999 | Berson | |
| 5,971,276 A | 10/1999 | Sano et al. | |
| 5,978,348 A | 11/1999 | Tamura | |
| 6,019,284 A | 2/2000 | Freeman et al. | 235/380 |
| 6,074,726 A | 6/2000 | Vezinet et al. | 428/195 |
| 6,138,913 A | 10/2000 | Cyr et al. | |
| 6,155,168 A | 12/2000 | Sakamoto | |
| D436,620 S | 1/2001 | Webb et al. | D19/10 |
| 6,186,398 B1 | 2/2001 | Kato et al. | 235/449 |
| D438,563 S | 3/2001 | Webb et al. | D19/10 |
| 6,196,465 B1 | 3/2001 | Awano | |
| 6,248,314 B1 | 6/2001 | Nakashimada et al. | |
| 6,255,031 B1 | 7/2001 | Yao et al. | |
| 6,277,232 B1 | 8/2001 | Wang et al. | |
| 6,290,137 B1 | 9/2001 | Kiekhaefer | 235/487 |
| 6,296,188 B1 | 10/2001 | Kiekhaefer | 235/487 |
| 6,581,839 B1 | 6/2003 | Lasch et al. | 235/487 |
| 6,749,123 B2 * | 6/2004 | Lasch et al. | 235/487 |
| 6,764,014 B2 * | 7/2004 | Lasch et al. | 235/487 |
| 2002/0066790 A1 | 6/2002 | Cocco | 235/491 |
| 2002/0130186 A1 | 9/2002 | Lasch et al. | 235/486 |
| 2002/0145049 A1 | 10/2002 | Lasch et al. | 235/487 |
| 2003/0017312 A1 | 1/2003 | Labrousse et al. | 428/195 |
| 2003/0047615 A1 | 3/2003 | Batoha | 235/491 |
| 2003/0141373 A1 | 7/2003 | Lasch et al. | 235/487 |
| 2004/0020992 A1 * | 2/2004 | Lasch et al. | 235/487 |
| 2004/0046034 A1 * | 3/2004 | Yamani et al. | 235/487 |

FOREIGN PATENT DOCUMENTS

| | | | |
|---|---|---|---|
| EP | 0 343 829 A | | 11/1989 |
| EP | 0843280A 2 | | 5/1998 |
| GB | 2106832 A | | 4/1983 |
| GB | 2 108 906 A | | 5/1983 |
| GB | 2229189 A | | 9/1990 |
| JP | 01004934 | | 10/1989 |
| JP | 1004934 A | | 10/1989 |
| JP | 8-169192 A | * | 7/1996 |
| JP | 11-020356 A | | 1/1999 |
| JP | 11-053496 A | | 2/1999 |
| JP | 2001-319325 A | | 11/2001 |
| JP | 2003-145964 A | * | 5/2003 |
| WO | WO 02/05204 | | 1/2002 |

OTHER PUBLICATIONS

IBM Technical Disclosure Bulletin, Infrared Transparent Credit Card (Dec. 1966).
Umaghan Instruments, The IRX Infrared Exclusion Filter (Jul. 31, 1999).
Optical Coatings Japan, Filters (2000), no month.
PV-7A, Ultra Compact Color Camera (Date Unknown).
Sport Optics International, Premium Optics for Serious Outdoorsmen (Date Unknown).
The Light Site Europe, Master Line ES (2000), no month.
Home Energy, Lighting Makeovers: The Best Is Not Always the Brightest (Nov./Dec 1994).
International Search Report for PCT/US00/24371 dated Feb. 28, 2001.
European Examination Report for 00961558.4 dated Jun. 26, 2003.

* cited by examiner

TRANSPARENT/TRANSLUCENT FINANCIAL TRANSACTION CARD

CROSS-REFERENCE TO RELATED APPLICATIONS

This application is a continuation of application Ser. No. 10/339,814, filed Jan. 10, 2003 now U.S. Pat. No. 6,705,530, entitled "Transparent/Translucent Financial Transaction Card," which is a continuation of application Ser. No. 09/675,912, filed Sep. 29, 2000 now U.S. Pat. No. 6,732,936, entitled "Transparent/Translucent Financial Transaction Card," which is a continuation-in-part of application Ser. No. 09/449,251, filed Nov. 24, 1999, entitled "Transparent/Translucent Financial Transaction Card," now U.S. Pat. No. 6,296,188, which is a continuation-in-part of application Ser. No. 09/411,359, filed Oct. 1, 1999, entitled "Transparent/Translucent Financial Transaction Card," now U.S. Pat. No. 6,290,137.

BACKGROUND OF THE INVENTION

1. Field of the Invention

This invention relates generally to financial transaction cards, including credit cards, debit cards, ATM (Automated Teller Machine) cards, and the like. More particularly, the invention relates to financial transaction cards that are transparent or translucent to human viewing yet can be detected by sensing devices in automated card processing equipment, such as embossing/encoding machines employed during card manufacturing, and card readers, such as those found in ATMs, automated fuel dispensers, and other point-of-sale card processing equipment.

2. Description of the Prior Art

For some time, financial institutions have been interested in offering financial transaction cards having areas that are transparent or translucent to human viewing. Prior art efforts to achieve such design effects have produced the following examples:

Cards incorporating transparent or translucent films.
Cards incorporating transparent or translucent magnifying lenses.
Cards incorporating transparent or translucent holograms.
Cards incorporating transparent or translucent lenticular patterns.
Cards incorporating other transparent or translucent optical effects.
Cards that are partially transparent or translucent, but also have a high level of opacity provided by the presence of coating(s) containing fillers or pigmentation.

The perceived advantage of a transparent or translucent financial transaction card is that the card will be relatively unique in the marketplace and impart status to the card user as compared to other users who have only opaque cards. A bank or other entity offering a transparent or translucent card can potentially attract users who will preferentially select such a card over competitive opaque cards, and thereby provide income to the institution as a result of card usage.

A significant problem with transparent or translucent cards is that the cards also need to function properly when processed during manufacture in card embossing/encoding equipment, and when deployed by users in card readers, such as those found in ATMs, automated fuel dispensers, and other point-of-sale card processing equipment. These machines utilize light transmission-based card sensing devices that are not able to detect the presence of transparent or translucent cards. This is due to the fact that the sensing devices, which typically comprise opposing source/detector pairs, are not able to see such cards as opaque (light blocking). The light emitted from the sensing device light sources located on one side of a transparent or translucent card passes through the card rather than being blocked from reaching the detectors located on the other side of the card.

Accordingly, there is a need for a transparent or translucent financial transaction card that overcomes the foregoing problem. What is required is a financial transaction card that is transparent or translucent to human viewing in one or more areas of the card, yet which is detectable by automated card processing equipment, of any type.

BRIEF SUMMARY OF THE INVENTION

A solution to the foregoing problem is provided, and an advance in the art is made, by the present invention in which a financial transaction card has one or more areas that are at least minimally transparent or translucent to human viewing, yet the card is detectable by the card sensing devices of automated card processing equipment.

In preferred embodiments of the invention, the card includes a substantially planar material sheet having upper and lower surfaces bounded by a continuous peripheral edge. The material sheet is formed to include the aforementioned one or more areas that are at least minimally transparent or translucent to human viewing. A filter is associated with at least one of these areas and provides sufficient opacity to light used in the card sensing devices to render the card detectable.

The automated card processing equipment may include card readers having source/detector pairs operating in a near Infrared light wavelength range of about 750–1200 nm, and more typically, about 850–1000 nm, and especially about 890 nm and 950 nm, which are the respective output wavelengths of two types of LEDs (Light Emitting Diodes) commonly used as light sources in many card readers. In that case, the filter should provide opacity relative to such wavelengths of not substantially less than the opacity required by the readers. The automated card processing equipment may also include card embossing/encoding machines having source/detector pairs operating in a near Infrared light wavelength range of about 830–1100 nm, and more typically, about 830–1000 nm, and especially about 920 nm and 950 nm, which are the respective output wavelengths of two types of LEDs commonly used as light sources in such equipment. In that case, the filter should provide opacity relative to such wavelengths of not substantially less than the opacity required by the equipment. If the card is to be compatible with both point-of-sale card readers and card embossing/encoding machines, the filter should comply with the wavelength requirements of both types of equipment.

The filter referred to herein includes any suitable medium or device that can provide the opacity required for automated card detection. By way of example, the filter can be made from a variety of light filtering materials, including materials that are light absorbing, light reflecting, light deflecting, light scattering or the like, relative to the applicable wavelength range. The filter can also be made from various combinations of such materials. Light absorbing materials that can be used for the filter include colorless light absorbers, light absorbing dyes, and other materials. Light reflecting materials that can be used for the filter include silver compositions, silver-titanium oxide compositions, and other materials. Light deflecting materials that can be used for the filter include light deflecting films. Light scattering materials that can be used for the filter include light scattering coatings. To the extent that the filter materials cause card discoloration, a suitable colorant can be introduced to produce an aesthetically pleasing card color or tint.

In specific filter constructions, a light filtering material (solid or liquid) can be incorporated in a liquid carrier and applied to the material sheet using screen printing or other application methods. Relatedly, the light filtering material can be similarly applied to a solid film that is then secured to the material sheet using lamination techniques, adhesive bonding, or other application methods. In alternative filter constructions, a light filtering material can be incorporated into the material sheet prior to or during extrusion or calendaring thereof (while it is a soft resin), or can be sublimated therein by heat diffusion processing, such that the light filtering material is disbursed through all or a portion of the material sheet. Relatedly, the light filtering material can be similarly introduced into a solid film that is then secured to the material sheet. In alternative filter constructions, a light filtering material can be deposited on the material sheet using a suitable deposition technique. Relatedly, the light filtering material can be similarly deposited on a solid film that is then secured to the material sheet. Still other filter constructions will no doubt become apparent to persons skilled in the art in view of the teachings herein.

In the preferred embodiments of the invention, the light filtering material is a near Infrared light absorbing material, such as a light absorbing dye, and the liquid carrier is a coating material comprising an organic solvent and a plastic resin (such as vinyl resin or acrylic resin). If desired, a colorant can be added to adjust the visible coloration of the resultant card. Suitable colorants include dye colorants, inks, light scattering materials, and fluorescent materials. Advantageously, the light scattering materials also provide a mechanism for reducing near Infrared light transmittance, as mentioned above. If desired, an Ultraviolet (UV) light absorbing material can be added to prevent degradation of the light filtering material.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which.

DETAILED DESCRIPTION OF THE INVENTION

I. General Considerations

For purposes of the present description, a transparent medium will be understood to be a material that transmits human-visible light without substantial scattering. A transparent medium allows a person to view definable images through it. A translucent medium will be understood to be a material that transmits human-visible light but with substantial light scattering. A person will be able to see light through a translucent medium but will not see defined images. An opaque medium will be understood as blocking a substantial portion of incident light within a particular wavelength range via absorption, reflection or otherwise. If a medium is opaque to human viewing, a person will not be able to detect any light being transmitting from one side to the other. If a medium is non-opaque to human viewing, it will be at least minimally transparent or translucent and a person will be able to see at least some light being transmitted from one side to the other.

Table 1 below illustrates the correlation between density (opacity) and transmittance as these concepts will be applied in describing the preferred embodiments of the invention. Table 1 is based on conversion calculations of density (opacity) to transmittance using the conversion formula Density=Log (1/Transmittance).

TABLE 1

| Correlation for Card Density(Opacity) and Transmittance | | | |
|---|---|---|---|
| Density (Opacity) | Approximate Light Transmittance | Density (Opacity) | Approximate Light Transmittance |
| 0.10 | 79% | 0.80 | 16% |
| 0.20 | 63% | 0.90 | 13% |
| 0.30 | 50% | 1.00 | 10% |
| 0.40* | 40% | 1.30 | 5% |
| 0.42 | 38% | 1.50 | 3% |
| 0.50 | 32% | 2.00 | 1% |
| 0.52 | 30% | 3.00 | 0.1% |
| 0.60 | 25% | 4.00 | 0.01% |
| 0.70 | 20% | | |

*Possible human perception limit of opacity in average visible light conditions

Figure 1:
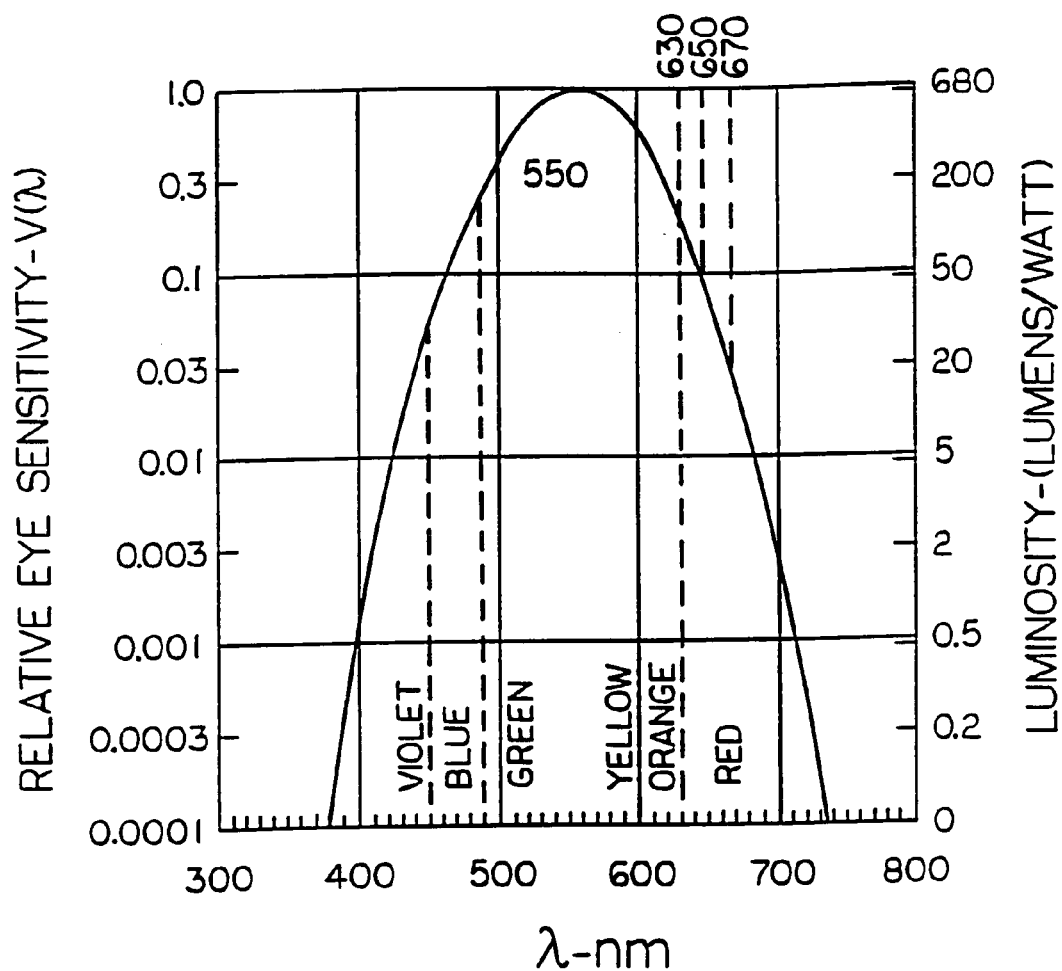
FIG. 1 is a graph showing human eye sensitivity and luminosity as a function of light wavelength.

The primary requirement of a financial transaction card in accordance with the invention is that it must have an area that transmits light at one or more wavelengths within the visible light range of the electromagnetic spectrum (380–750 nm) with sufficient transmittance to be perceived as being at least minimally transparent or translucent by a human viewer. FIG. 1 illustrates relative light sensitivity of the human eye as a function of wavelength. As shown therein, greatest human light sensitivity is at 550 nm. Based on visual correlation between measured card samples and human viewing of those samples under average viewing conditions (e.g., room light), and based on Table 1 above, it has been determined by Applicant that a financial transaction card should preferably transmit at least about 40% of incoming visible light for it to appear to be noticeably different from a standard opaque card to card users. However, because lower (e.g., 5–20%) or higher (e.g., 70–80%) transmittance levels may be desired, depending on customer preferences, the 40% level should not be construed as limiting relative to the invention. For example, Applicant has produced financial transaction cards having a visible light transmission level of about 19% (0.72 opacity) and this card can be considered translucent. In some cases, it may be possible to lower the transmittance level to about 0.5% (1.3 opacity) before most individuals will not be able to see light through the card in normal room lighting. As a practical requirement for financial transaction cards that are transparent or translucent to visible light, yet still detectable by automated card processing equipment, a minimal transmittance level of about 15% visible light may be used.

As indicated above, a financial transaction card need not transmit light at all wavelengths within the visible light range to be considered transparent or translucent. That is, the light being transmitted through the card need not encompass the full visible spectrum, such that the card appears colorless. It is sufficient that the transmitted light be constituted at some human visible wavelength, or at multiple human visible wavelengths, at some minimal level of transmittance which is sufficient for human recognition.

As used hereinafter, when speaking of the transmittance/opacity of a financial transaction card in the human-visible light range, it will be understood that the card has been measured with respect to at least one human-visible wavelength. This is seen in examples 1–5 below wherein transmittance/opacity is measured at 550 nm, the wavelength of greatest human light sensitivity. In other cases, and particularly examples 6–9 below, transmittance/opacity in the visible light range is measured more broadly across multiple visible wavelengths. In particular, an X-Rite 361T Densitometer, made by X-Rite, Inc. of Grandville, Mich., is used to measure visible light transmittance/opacity in these examples. This machine measured over a range of about 400–750 nm, and may be considered to provide a more accurate measurement of human visible light transmittance than measurements taken at a single visible light wavelength.

II. Card Reader Considerations

As indicated by way of background above, the devices for sensing the presence of financial transaction cards in point-of-sale card readers generally consist of a light source and a light detector paired together to identify the presence of a card if light emitted by the source is blocked from reaching the detector. The absence of a card is identified if there is light transmission to the detector. Typically, multiple source/detector pairs are employed. At least one pair is located at or near the card insertion slot and additional pairs are usually spaced over the entire surface of the card. In order for a financial transaction card to be detected in a card reader, it must be substantially opaque to the detectors.

The light sources used in card readers are usually LEDs. These generally have characteristic narrow output peaks lying within a wavelength range of about 750–1200 nm. In particular, most older card readers use LEDs operating at about 890 nm, while most newer card readers use LEDs operating at about 950 nm. On the other hand, the detectors in card readers typically have broad sensitivity across the 750–1200 nm wavelength range. According to the standard known as "WP7810," in order for a financial transaction card to be able to block the detectors in a typical card reader from seeing the LED output, such that card detection can occur, the card must have a minimum opacity relative to the LED output wavelengths of between about 1.1 and 1.3. Of course, this range may not apply to all card readers currently in use, and it may not apply to future card readers in the event that design changes are made. Indeed, Applicant has observed that whereas a minimum opacity of between about 1.0–1.3 may be safely used as a lower limit in many cases, other card readers require higher opacities of about 1.5, or even about 2.00. Generally speaking, opacities of about 1.0–1.3 will be sufficient for card detection in card readers that are considered to be "fault tolerant." Such machines will allow a maximum transmission level of 10% (1.0 opacity). Other card readers are considered to be "non-fault tolerant" and will allow a maximum transmission level of 3% (1.5 opacity). Still other card readers are considered to be "high security" and will allow a maximum transmission level of only 1% (2.0 opacity).

III. Embossing/Encoding Machine Considerations

Figure 2:
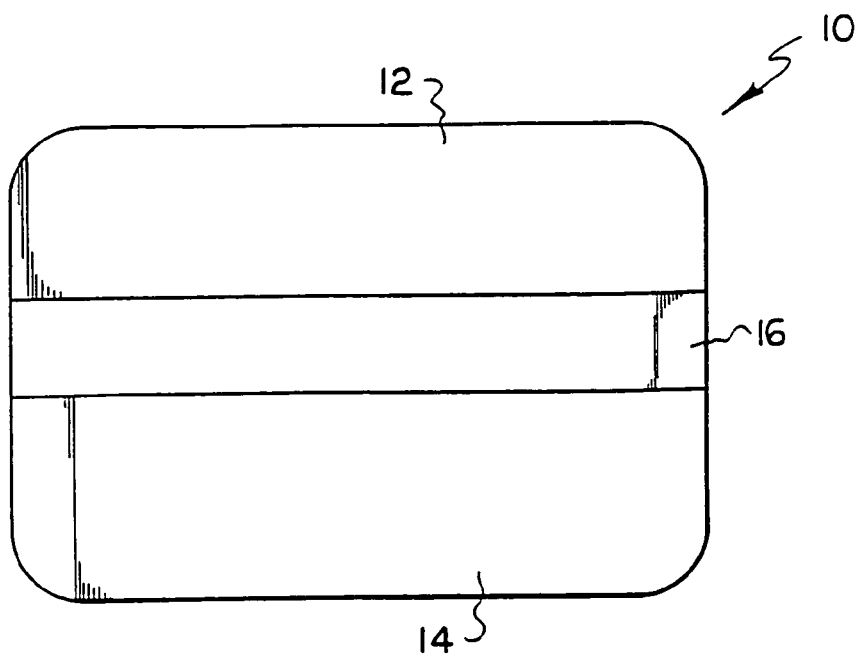
FIG. 2 is a plan view of a financial transaction card showing opacity requirements for a conventional card embossing/encoding apparatus.

Conventional financial transaction card embossing/encoding machines used during card manufacture typically employ multiple sensors of the source/detector type to determine the presence and proper positioning of the cards. For example, the DataCard 9000 machine, manufactured by Datacard Corporation of Minnetonka, Minn., has more than fifteen sensors that check for opacity across portions of the card surface. These portions are shown in FIG. 2, which illustrates a card 10 having opaque areas conforming to the requirements of the DataCard 9000 machine. In order for the DataCard 9000 machine to function properly, a first band 12 is required to be opaque and have a band height of at least 0.826 inches, and a second band 14 is required to be opaque and have a band height of at least 1.000 inches. The remaining band 16, having a nominal band height of 0.389 inches, has no requirement for opacity. It will be appreciated that other embossing/encoding equipment may have different opacity requirements.

In the DataCard 9000 machine, the card sensors are said to detect in the near Infrared spectral region, and specifically in a wavelength range of about 830–1100 run. More particularly, it is understood that the LED light sources in the card sensors of this machine transmit light at about 950 nm. According to the manufacturer's specifications, to be detected by a DataCard 9000 machine, the bands 12 and 14 of the card 10 must have a minimal measured opacity of 1.0 (10% transmittance) in this spectral region. Another commonly used LED output wavelength used in embossing/encoding machines is about 920 mm.

IV. Preferred Technical Solution Provided by the Invention

Figure 3:
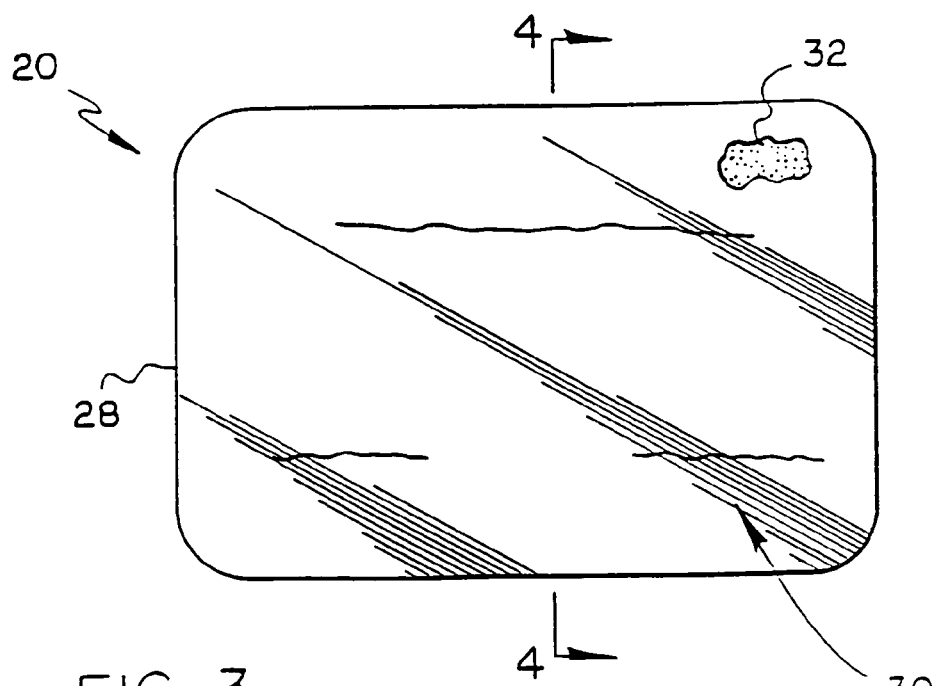
FIG. 3 is a plan view of a financial transaction card constructed in accordance with a preferred embodiment of the present invention.
Figure 4A:
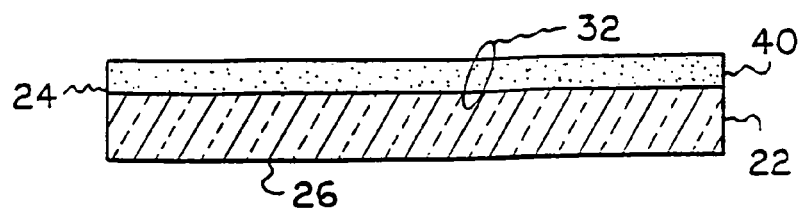
FIGS. 4a, 4b, 4c, 4d, 4e and 4f are cross-sectional views taken along line 4—4 in FIG. 3 having exaggerated thickness to show the construction of a filter in accordance with various fabrication techniques.
Figure 4B:
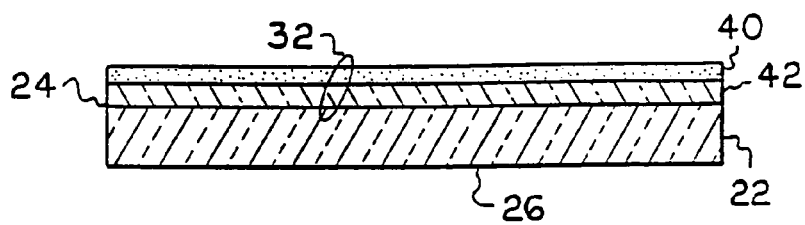
Figure 4C:
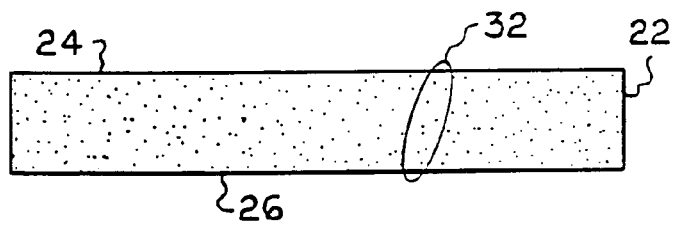

Turning now to FIGS. 3 and 4a–f, a financial transaction card 20 constructed in accordance with a preferred embodiment of the present invention includes a substantially planar material sheet 22 made from polyvinyl sheet stock or other suitable material. The material sheet 22 has upper and lower surfaces 24 and 26, respectively, and a continuous peripheral edge 28. The material sheet 22 is provided with one or more areas that are at least minimally transparent or translucent relative to human viewing. In FIG. 3, reference number 30 identifies one such area extending over the entire surface of the material sheet 22. To achieve this configuration, the material sheet 22 is preferably made entirely from transparent or translucent (polyvinyl, acrylic, polyester, etc.) sheet stock. To render the area 30 opaque to the card sensing devices of automated card processing equipment, a filter, partially illustrated by reference numeral 32, is provided. As shown in FIGS. 4a–f, the filter 32 can be located at the upper surface 24 of the material sheet 22, or at any location below the upper surface. For example, although not shown, the filter 32 could also be located at or near the lower surface 26 of the material sheet 22. As shown in FIG. 4c, the filter 32 may be disbursed throughout the material sheet 22, in which case the filter will be simultaneously located at the material sheet's upper surface, lower surface, and at locations therebetween.

The filter 32 is designed to provide opacity relative to wavelengths that are within the active wavelength range of the source/detector pairs used in the card sensing devices of card processing equipment, such as embossing/encoding machines and card readers. Considering sections II and III above, the worst-case scenario may be provided by card readers, which have source/detector pairs placed across the entire card surface, and which appear to require a minimum opacity of between about 1.0–1.3 at one or more specific wavelengths within the 750–1200 nm wavelength range, i.e., at the wavelengths output by the card reader LEDs. The filter 32 should thus preferably be designed to these specifications. One way to satisfy this goal relative to the card 20 is to extend the filter 32 over the entirety of the transparent or translucent area 30 of the material sheet 22, i.e., over the entire card 20, and provide an opacity of at least about 1.0–1.3 over the entire 750–1200 nm card reader wavelength range. Alternatively, as discussed relative to FIGS. 5–7 below, the filter 32 can be tailored to provide the required opacity relative to the specific wavelengths output by card reader LEDs. In either case, higher opacities on the order of 1.5 and 2.0 will be respectively required for non-fault tolerant and high security card readers.

The filter 32 can be made in a variety of ways. For example, it can be made from a light filtering material that is either light absorbing, light reflecting, light deflecting, light scattering or the like, relative to the applicable wavelength range. The filter 32 can also be made from various combinations of such materials. Light absorbing materials that can be used for the filter 32 include colorless light absorbers, light absorbing dyes, and other materials. In the event that dyes are used, a suitable colorant may be added to the card as necessary to provide an aesthetically pleasing card color or tint. Suitable colorants include dye colorants, light scattering materials, and fluorescent materials. Light reflecting materials that can be used for the filter 32 include silver compositions, silver-titanium oxide compositions, and other materials. Light deflecting materials that can be used for the filter 32 include light deflecting films. Light scattering materials that can be used for the filter 32 include light scattering coatings.

In specific constructions, the filter 32 can be fabricated and applied to the material sheet 22 in a variety of ways. In FIG. 4a, a suitable light filtering material, such as a near Infrared light absorbent dye powder, is added to a suitable liquid carrier, such as a coating material comprising an organic solvent and a plastic resin (plastic resin-based coating). Suitable plastic resins include (but are not limited to) vinyl resin (producing a vinyl resin-based coating) and acrylic resin (producing an acrylic resin-based coating).

If a light absorbent dye and a plastic resin-based coating material are used to form the filter 32, the dye can be combined with the coating material at a dye-to-coating weight ratio of up to about 20% (depending on the number of filter layers being applied (see below)). More preferably, the dye-to-coating weight ratio is between about 0.2%–5.0%, and still more preferably between about 0.5%–3.5%, and most preferably between about 1.0%–2.5%. If desired, an appropriate thinner can be used to pre-dissolve the dye prior to adding it to the coating material.

The filter 32 can be applied as a filter coating 40 to the material sheet 22 (e.g., made from polyvinyl sheet stock), using screen printing at a mesh size ranging from about 90–390 mesh. Other application methods can also be used, including roll coating, flexography, wire-wound rod application, and others. One or more layers (e.g. 2–4 layers) of the filter coating 40 can be applied to the material sheet 22 as necessary to obtain the needed near Infrared opacity.

One or more colorants may be used in the foregoing application to adjust the color of the resultant card, as can fluorescent materials and light scattering materials. The fluorescent and light scattering materials have the additional benefit of acting as light blocking enhancers. Dye colorants can be added to the liquid carrier used to form the filter coating 40 prior to its application to the material sheet 22. Fluorescent materials can be added in the same way. Light scattering materials can be added by mixing them in the same type of carrier used for the filter coating 40, and applying the mixture as a separate coating to the material sheet 22, e.g., on the side that is opposite the filter coating.

If a light absorbent dye is used as the filtering material in combination with a plastic resin-based coating material, the issue of UV light and/or heat instability may be presented. Some solvent-soluble dyes will degrade in the presence of free radicals that can be generated when the financial transaction card is exposed to sunlight or to heat during lamination processing at high temperatures. As described in more detail below, these concerns can be addressed by lowering lamination processing temperatures from the usual processing range of about 270–300 degrees F. to about 230–270 degrees F. Additionally a stable dye, or a mixture of a stable dye and a less stable dye combined at a suitable weight ratio (e.g., about 1:10 to 1:5) of stable dye to less stable dye, may be used. An antioxidant stabilizer may also be added to function as a free radical absorber. It can be added to the dye/coating mixture prior to its application to the material sheet 22 as the filter coating 40. More preferably, however, the stabilizer is applied as a separate cover layer over the filter coating 40 after the latter has been applied to the material sheet 22.

In FIG. 4b, a suitable light filtering material (e.g., a light absorbent dye) is added to a suitable liquid carrier (e.g., a plastic resin-based coating material) and applied as a coating 40 (see description of FIG. 4a) on a film 42 (e.g., made from the same material as the material sheet 22) using screen printing or other methods. The film 42 is then itself secured to the material sheet using lamination techniques, adhesive bonding, or other application methods.

In FIG. 4c, a suitable light filtering material is incorporated into the material sheet 22 prior to or during calendaring or extrusion thereof (when it is a soft resin), or is sublimated therein by heat diffusion processing, such that the light filtering material is disbursed through all or a portion of the material sheet.

Figure 4D:
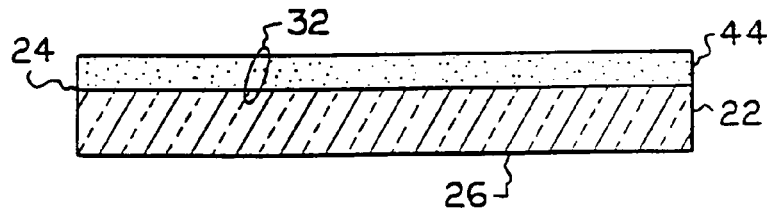

In FIG. 4d, a suitable light filtering material is incorporated in a film 44 during calendaring or extrusion thereof (when it is a soft resin), or is sublimated therein by heat diffusion processing. The film 44 is then itself secured to the material sheet 22 using lamination techniques, adhesive bonding, or other application methods.

Figure 4E:
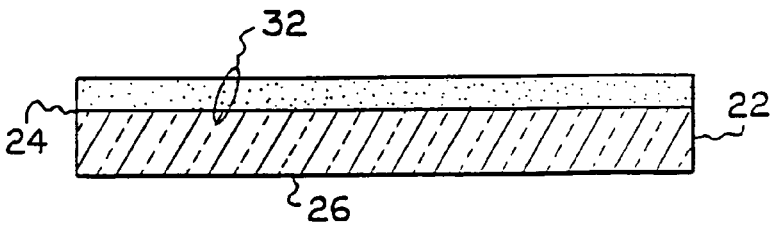

In FIG. 4e, a suitable light filtering material, such as a silver-titanium oxide coating material, is deposited on the material sheet 22 using a suitable deposition technique (e.g., vacuum deposition). Multiple layers (e.g., 2–4) may be applied as necessary to obtain the required opacity.

Figure 4F:
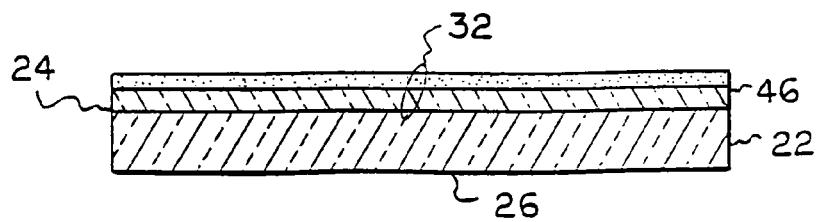

In FIG. 4f, a suitable light filtering material is deposited on a film 46 using a suitable deposition technique and the film is then itself secured to the material sheet 22 using lamination techniques, adhesive bonding, or other application methods.

Still other filter constructions will no doubt also be apparent to persons skilled in the art in view of the teachings herein. Specific construction examples follow:

EXAMPLE 1

In this example, 22 grams of a first near Infrared powdered absorption dye, sold under the name ADS 1065A by American Dye Source, Inc. of Mount Royal, Quebec, Canada, and 3 grams of a second (more light and heat stable) near Infrared powdered absorption dye, sold under the name ADS870MC by American Dye Source, Inc. (both dyes being organic solvent-soluble), were pre-dissolved in 110 grams of an organic solvent-based thinner sold under the name Nazdar VF 190 by Nazdar Co., Inc. of Chicago, Ill.

The foregoing mixture was combined with 990 grams of a clear vinyl resin-based coating material, sold by Nazdar Co., Inc. under the name Nazdar 132688AB. The Nazdar 132688AB vinyl resin-based coating material is understood to include the following components (with all percentages being by weight):

| | |
|---|---|
| Vinyl resins | 20–25% |
| Petroleum Distillates (Aromatic) | 35–40% |
| Cyclohexanone | 5–10% |
| Diacetone Alcohol | 5–10% |
| Gamma Butyrolactone | 5–10% |
| Napthalene | less than 5% |
| Petroleum Distillates (Aliphatic) | 2% |

The Nazdar VF 190 thinner is understood to have the same organic solvent components and component ratios, but does not have the vinyl resins.

Because the resultant solution had a yellow tint, two organic, solvent-soluble colorants were used to add violet color to the solution to yield a neutral gray tint in the cards produced.

These colorants are sold by CIBA Specialty Chemicals of Tarrytown, N.Y., under the names Orasol Red BL 125414AA and Orasol Blue GN 0180146AA. The amount of colorant added was 0.25 grams of the red colorant and 0.35 grams of the blue colorant. The foregoing filtering mixture was stirred at room temperature for approximately 15 minutes and then coated onto a transparent 15 mil calendared vinyl film with screen printing using a 195 mesh screen. In the card samples produced, 2, 3 and 4 layers of the filtering mixture were respectively used in making three different groups of the samples. The coated film was then compression laminated onto a transparent 15 mil polyvinyl base sheet (approximately 30 mil total card thickness).

Figure 5:
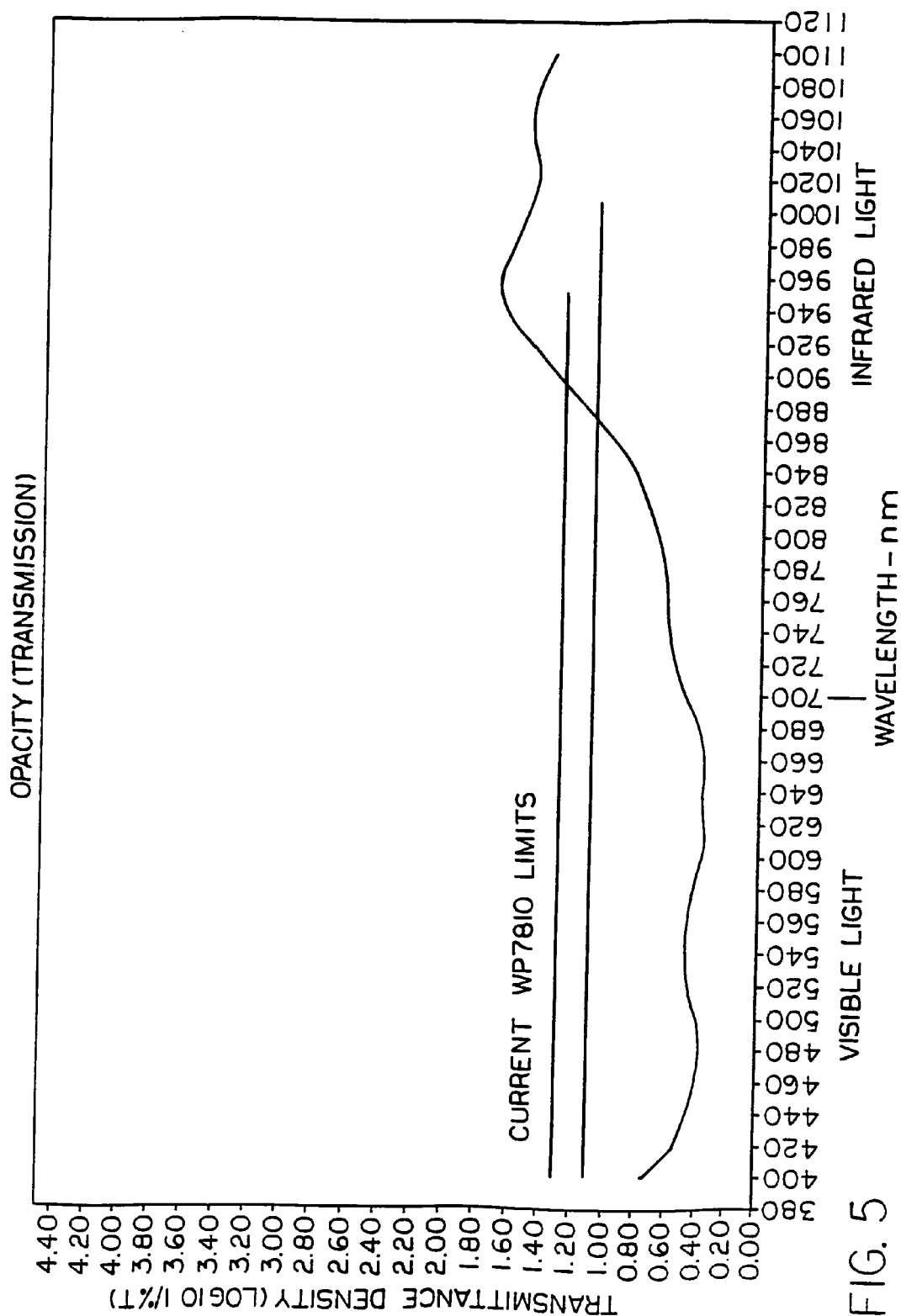
FIG. 5 is a graph showing opacity versus wavelength for a tested card having two filtering layers.
Figure 6:
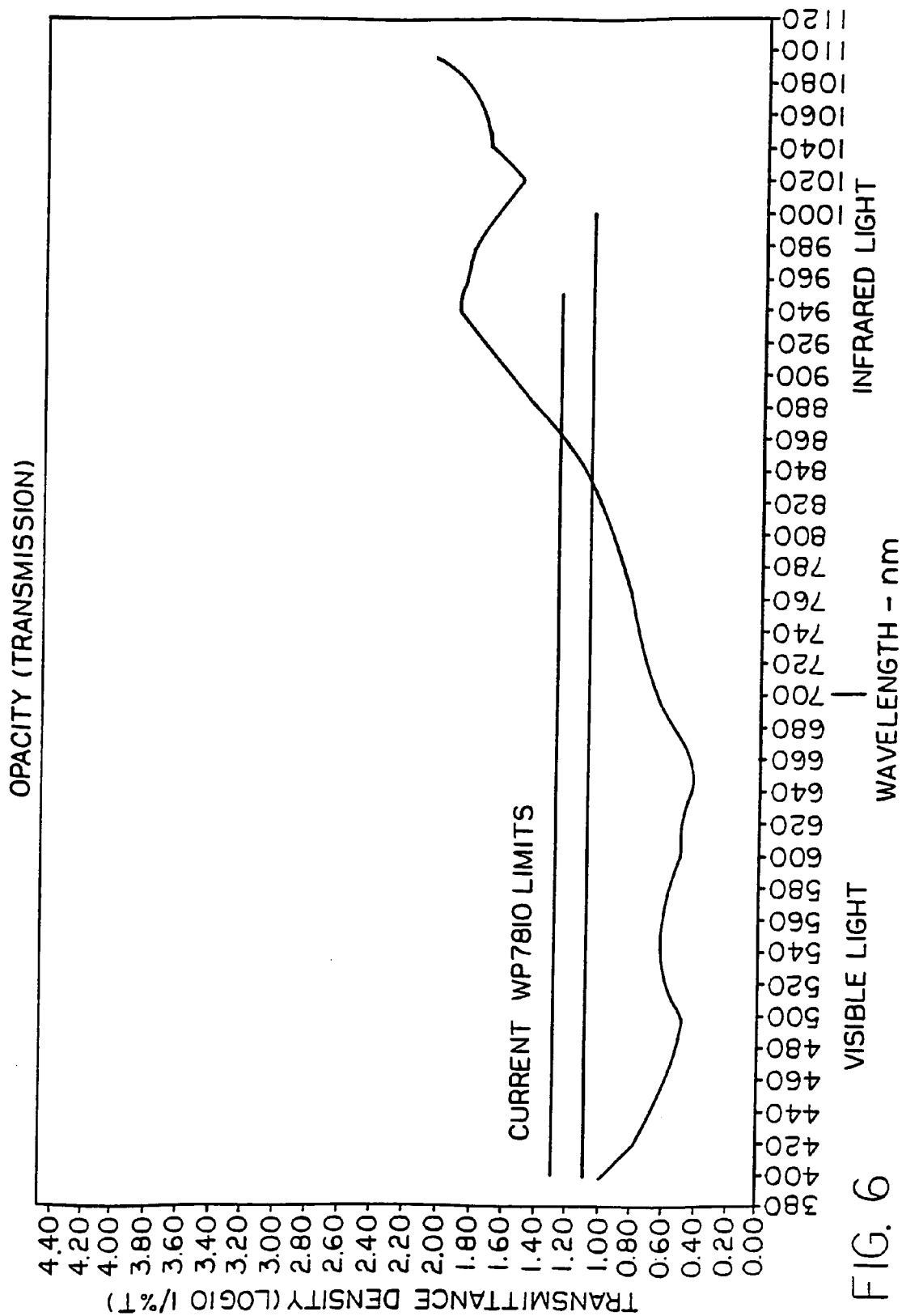
FIG. 6 is a graph showing opacity versus wavelength for a tested card having three filtering layers.
Figure 7:
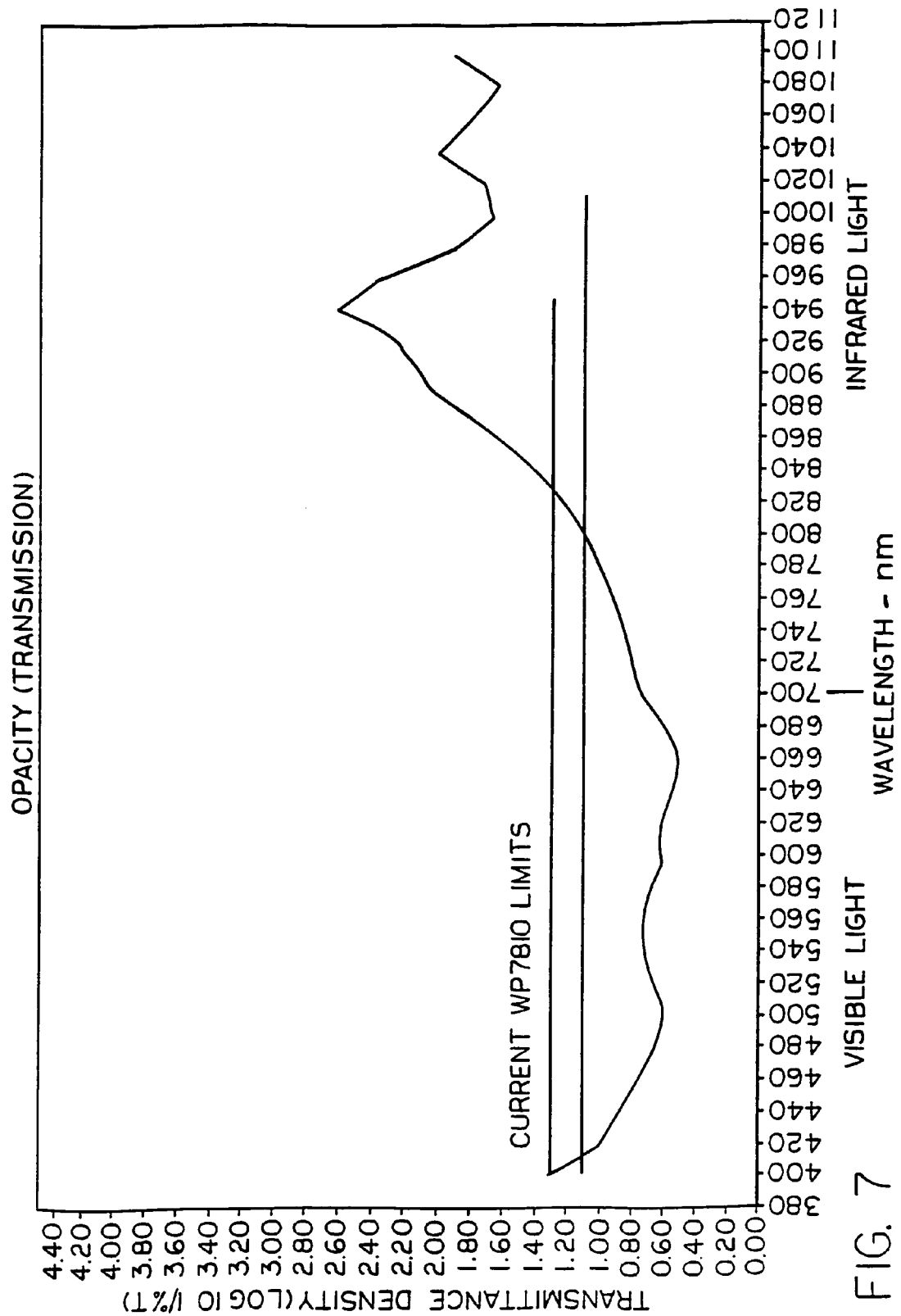
FIG. 7 is a graph showing opacity versus wavelength for a tested card having four filtering layers.

Cards constructed according to this example were tested and found to be detectable by card readers used in ATM machines. In addition, the cards were subjected to spectrographic analysis. FIGS. 5, 6 and 7 illustrate the results that analysis. FIG. 5 shows test results for a 2-layer card, FIG. 6 shows test results for a 3-layer card, and FIG. 7 shows test results for a 4-layer card. In each figure, opacity is plotted against wavelength, and the current WP7810 minimum opacity range limits of 1.1 and 1.3 are also highlighted.

As shown in FIG. 5, with 2 filtering mixture layers, the opacity was about 0.4 (40% transmittance) when measured at a visible wavelength of 550 nm. In the near Infrared light range, the opacity begins at approximately 0.6 (25% transmittance) at the 750 nm wavelength threshold and climbs until it reaches an opacity of approximately 1.1–1.3 (7–5% transmittance) at wavelengths of approximately 880–895 nm. At a wavelength of 890 nm, the opacity is about 1.3 (5% transmittance). The opacity then continues to increase until it peaks at approximately 1.7 (2% transmittance) at a wavelength of approximately 960 nm, and then begins to gradually taper off, although never dropping below an opacity of 1.3 (5% transmittance) through at least a wavelength of about 1100 nm. At a wavelength of 950 nm, the opacity is about 1.7 (2% transmittance).

As shown in FIG. 6, with 3 filtering mixture layers, the opacity was about 0.6 (25% transmittance) when measured at a visible wavelength of 550 nm. In the near Infrared light range, the opacity begins at approximately 0.8 (16% transmittance) at the 750 nm wavelength threshold and climbs until it reaches an opacity of approximately 1.1–1.3 (7–5% transmittance) at wavelengths of approximately 820–860 nm. At a wavelength of 890 nm, the opacity is about 1.5 (3% transmittance). The opacity then continues to increase until it peaks at an opacity of approximately 2.0 (1% transmittance) at a wavelength of approximately 940 nm. The opacity then tapers off to a level of approximately 1.5 (3% transmittance) at a wavelength of approximately 1020 nm, and then begins increasing again such the opacity remains above 1.3 (5% transmittance) through at least a wavelength of about 1100 nm. At a wavelength of 950 nm, the opacity is about 1.9 (1% transmittance).

As shown in FIG. 7, with 4 filtering mixture layers, the opacity was about 0.7 (20% transmittance) when measured at a visible wavelength of 550 nm. In the near Infrared light range, the opacity begins at approximately 0.9 (13% transmittance) at the 750 nm wavelength threshold and climbs until it reaches an opacity of approximately 1.1–1.3 (7–5% transmittance) at wavelengths of approximately 805–830 nm. At a wavelength of 890 nm, the opacity is about 2.0 (1% transmittance). The opacity then continues to increase until it peaks at an opacity of approximately 2.6 (0.2% transmittance) at a wavelength of approximately 940 nm. The, opacity then tapers off to a level of approximately 1.7 (2% transmittance) at a wavelength of approximately 1000 nm, and then reaches another opacity peak of approximately 2.0 (1% transmittance) at a wavelength of approximately 1040 nm. Tapering again occurs to an opacity of approximately 1.6 (2.5% transmittance) at a wavelength of approximately 1080 nm, whereupon the opacity again begins to increase such the opacity remains above 1.3 (5% transmittance) through at least a wavelength of about 1100 nm. At a wavelength of 950 nm, the opacity is about 2.5 (0% transmittance).

EXAMPLE 2

In this example, 13.00 grams of a near Infrared absorption dye powder, sold under the name Epolight III-57 by Epolin of Newark, N.J., and 4.33 grams of an organic solvent-soluble UV absorber, sold under the name Cyasorb UV 5411 from Cytec Industries, Inc. of West Paterson N.J., were pre-dissolved in 130.00 grams of the Nazdar VF 190 thinner. The Epolight-57 dye is an Antimony-based, organic solvent-soluble material having good visible light transmittance, good heat stability and maximum light absorbence at a wavelength of about 950 nm.

The foregoing mixture was combined with 633.00 grams of the Nazdar 132688AB material. To adjust the resultant color and offset the yellow tint of the Epolight material, two organic solvent-soluble fluorescent colorants were added. These colorants are sold by Day-Glo Color Corp. of Cleveland, Ohio under the names DayGlo Blue VC19 and DayGlo Red VC11. The amount of each of the colorants was 21.66 grams. The foregoing filtering mixture was stirred at room temperature for approximately 15 minutes and then coated onto a transparent 15 mil calendared vinyl film with screen printing using a 195 mesh screen. The coated film was then compression laminated onto a transparent 15 mil polyvinyl base sheet (approximately 30 mil total card thickness). The opacity measured at a visible wavelength of 550 nm was about 0.2 (63% transmittance) for cards produced according to this example. In the near Infrared light range at 950 nm, the opacity was slightly greater than about 1.0 (10% transmittance).

EXAMPLE 3

In this example, 15.00 grams of the Epolight III-57 absorption dye and 4.5 grams of the Cyasorb UV5411 UV absorber were mixed with 980.5 grams of the Nazdar 132688AB material. The foregoing filtering mixture was stirred at room temperature for approximately 15 minutes and then coated onto a transparent 15 mil calendared vinyl film with screen printing using a 195 mesh screen. The opacity measured at a visible wavelength of 550 nm was about 0.2 (63% transmittance) for cards produced according to this example. In the near Infrared light range at 950 nm, the opacity was about 1.2 (6% transmittance).

EXAMPLE 4

In this example, 13.00 grams of the Epolight III-57 dye and 4.33 grams of the Cyasorb UV 5411 UV absorber were pre-dissolved in 130.00 grams of the Nazdar VF 190 thinner. This mixture was combined with 633.00 grams of the Nazdar 132688AB material. To adjust the resultant color and offset the yellow tint of the Epolight material, the fluorescent colorants of Example 2 were added to the coating. The amount of fluorescent material added was 65.00 grams of the DayGlo Blue VC19 material and 21.66 grams of the DayGlo Red VC11 material. The foregoing filtering mixture was stirred at room temperature for approximately 15 minutes and then coated onto a transparent 15 mil calendared vinyl film with screen printing using a 195 mesh screen.

In addition to the foregoing, the vinyl film to which the filtering mixture was applied was also coated (on the opposite side from the filtering mixture) with a mixture containing 907.50 grams of the Nazdar 13288AB material, 90.00 grams of a translucent light scattering material sold under the name Silver Fox Fine Pearl by FM Group Inc. of Sloatsburg, N.Y., and 2.50 grams of a fluorescent whitening agent sold under the name Uvitex OB by CIBA Specialty Chemicals of Tarrytown N.Y.

The foregoing mixture was coated on the vinyl film using a 195 mesh screen, prior to applying the filtering mixture. The coated film was then compression laminated onto a transparent 15 mil polyvinyl base sheet (approximately 30 mil total thickness). The opacity measured at a visible wavelength of 550 nm was about 0.8 (16% transmittance) for cards produced according to this example. In the near Infrared light range at 950 nm, the opacity was about 1.5 (3% transmittance).

Additionally, it has been found that the use of transparent fluorescent pigments, such as the DayGlo materials described above, can neutralize the yellow-green color of the near Infrared absorbing material with less darkening than can standard pigments and dyes. Fluorescent materials have the property of absorbing light in one region of the spectrum and re-emitting light in the visible region (400–700 nm). This has the effect of brightening the appearance of materials to which they are added.

Applicant has also discovered that the addition of light scattering mechanisms to the card can work in conjunction with the light filtering material. For example, the above-described Silver Fox Fine Pearl translucent material is a light scatterer. It appears that unidirectional light from a near Infrared light source is scattered in all directions so as to reduce the amount of light seen by an opposing detector. The same amount of light is being transmitted through the card (at any wavelength), but only a small amount is seen as unidirectional light by the detector. Test data indicates that the amount of light seen by the detector can be reduced by as much as about 50% by the addition of light scattering mechanisms.

Another light scattering mechanism is to manufacture the card with a flat (as opposed to gloss) surface. The application of this type of surface to one or both sides of the card will reduce light seen by the detector by up to about 50%.

A preferred light scattering material was found to be retro-reflective beads (glass spheres) such as T4 beads from Potters Industries Inc. of Valley Forge, Pa. Prototype samples were made by applying the beads evenly across a wet coating on a vinyl sheet and then drying the coating. The vinyl sheet was then laminated as a card. Spectrophotometer readings across the spectrum were in the 15–20% transmittance range as only this portion of all wavelengths was being allowed to transmit through the material unidirectionally. Of significance is the fact that the index of refraction of the glass sphere beads is 1.90 as compared to 1.50 for the vinyl sheeting.

It is noteworthy that reduction of measured transmittance by a spectrophotometer or reduction of light seen by a detector in a card sensing device through light scattering mechanisms works across the entire light spectrum. The visible spectrum is affected as much as the near Infrared region. Thus, the overuse of light scatterers will work against the requirement for a card that is transparent with respect to human-visible light.

EXAMPLE 5

A silver-titanium oxide coating, sold under the registered trademark SOL-MOX by Innovative Specialty Films LLC, of San Diego, Calif., was applied to the surface of a transparent 3 mil polyester film using vacuum deposition processing. In the card samples produced, four such film layers were formed and compression laminated onto a transparent polyvinyl base sheet (30 mil total thickness). Note that the cards produced in accordance with this example were somewhat opaque in the visible light range and this production method is therefore not as preferred as the production methods of previous examples.

Following are additional examples in which multiple filtering layers are used to produce financial transaction cards in accordance with the invention. The basic design model used for these examples is a ten (10) layer card in which the layers are as follows:

| Layer 1 | Clear Protective Overlay |
| Layer 2 | Printed Graphics on Layer 3 |
| Layer 3 | Light Filtering Coating on Layer 4 |
| Layer 4 | Clear Plastic Core Stock |
| Layer 5 | Light Filtering Coating on Layer 4 |
| Layer 6 | Light Filtering Coating on Layer 7 |
| Layer 7 | Clear Plastic Core Stock |
| Layer 8 | Light Filtering Coating on Layer 7 |
| Layer 9 | Printed Graphics on Layer 8 |
| Layer 10 | Clear Protective Overlay |

Figure 8:
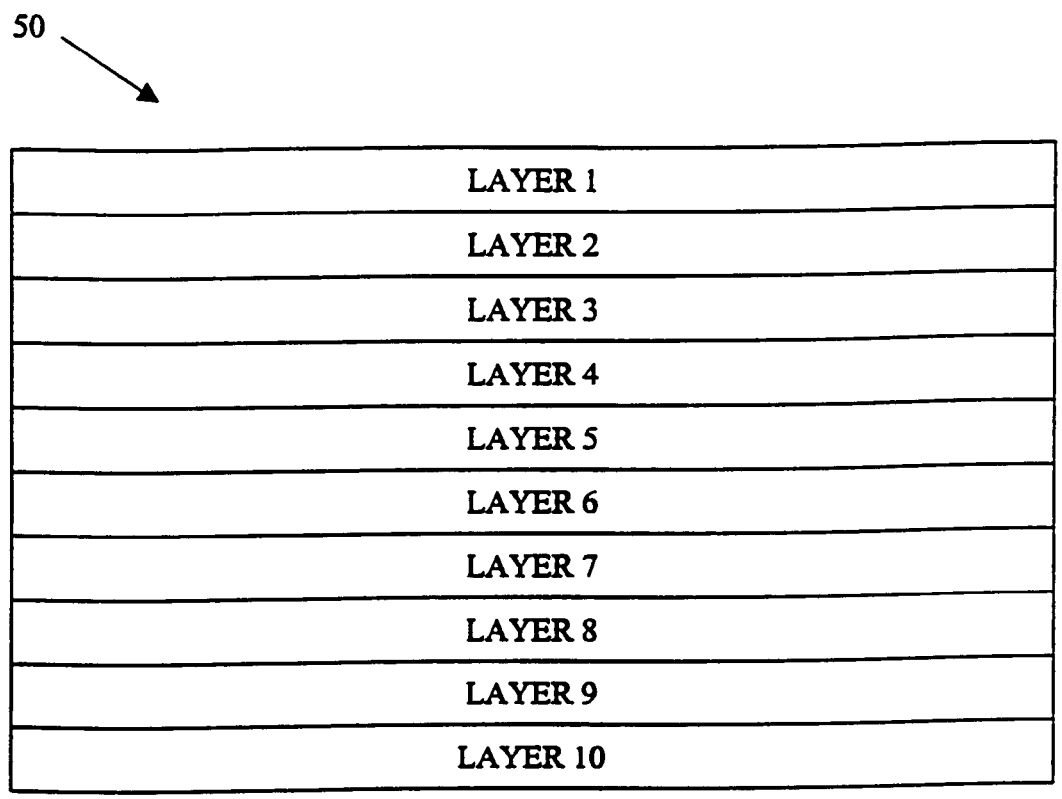
FIG. 8 is an elevated side view of another financial transaction card having a ten layer, multiple filter construction.

FIG. 8 illustrates a side view of the foregoing card (50). Fabrication is performed as follows: The light filtering coating layer 3 is applied to completely cover one side of the clear plastic core stock layer 4, and the light filtering coating layer 8 is applied to completely cover one side of the clear plastic core stock layer 7. As is conventional, each clear plastic core stock layer 4 is a rectangular planar sheet of sufficient size to produce one or more finished cards. The printed graphics layer 2 is then printed onto the light filtering coating layer 4 and the printed graphics layer 9 is printed onto the light filtering coating layer 8. The light filtering coating layer 5 is next applied to the clear plastic core stock layer 4, on the side opposite layers 3 and 2. The light filtering coating layer 6 is applied to the clear plastic core stock layer 7, on the side opposite layers 8 and 9. The two assemblies respectively comprising the clear plastic core stock layers 4 and 7 are then placed together in a collating machine along with the clear protective overlay layers 1 and 10, which are respectively placed over layers 2 and 9. While still in this arrangement, the entire lay-up is lightly tack welded together using heat welding to form a composite assembly. The composite assembly is then placed in a lamination machine for heat lamination. Individual cards can now be cut to size out of the laminated assembly.

Note that in one of the examples below (example 6), the light filtering coating layer 5 is omitted and a more concentrated light filtering coating layer 6 is used. In this same example, a matte finish is also used to provide additional near Infrared light blockage. In two other examples (examples 7 and 8), both of the light filtering coating layers 3 and 8, which are translucent coating layers, are left out in order to produce a transparent card.

EXAMPLE 6

Cards produced according to this example have all of the ten (10) layers shown in FIG. 8 and described above, with the exception of the light filtering coating layer 5, which is not used, thus yielding a nine (9) layer card with three (3) filtering layers. One of the filtering layers (layer 6) is a light absorbing filter layer that also has light scattering properties. The remaining two filtering layers (layers 3 and 8) are light scattering filter layers. The cards of this example also have a matte finished applied to layer 1. The matte finish reduces the amount of source light that travels unidirectionally through the card to a card sensing device detector by approximately 50%. Note that the use of matte finish coatings on financial transaction cards is generally known in the art. The specific materials and processing methods used to form the layers of the cards of this example are identified in the table below:

| Layer 1 | 1.8 mil clear vinyl film of conventional design. Matte finish applied during production lamination using conventional processing. | | |
|---|---|---|---|
| Layer 2 | Lithographic print pass | | |
| Layer 3 | FM Group 17923 Silk Frost Ink | | Applied as a coating with 305 mesh screen |
| Layer 4 | 13 mil clear vinyl sheet of conventional design | | |
| Layer 5 | No Layer 5 | | |
| Layer 6 | Epolight III-57 | 69.00 g | Applied as a coating with 305 mesh screen |
| | BASF Sudan Blue 670 | 7.20 g | |
| | CK Interplast Red | 6.00 g | |
| | UV5411 | 30.00 g | |
| | BHT | 30.00 g | |
| | 3M W-210 Zeeospheres | 780.00 g | |
| | Nazdar VF190 | 300.00 g | |
| | Nazdar 132688A | 4777.80 g | |
| Layer 7 | 13 mil clear vinyl sheet of conventional design | | |

-continued

| Layer 8 | FM Group 8130191 Satin Frost Pigment | 101.00 g | Applied as a coating with 305 mesh Screen |
|---|---|---|---|
| | Nazdar 132688A | 869.00 g | |
| | Uvitex OB | 25.00 g | |
| | Degussa Acematt HK450 | 5.00 g | |
| Layer 9 | Lithographic print pass | | |
| Layer 10 | 1.8 mil clear vinyl film of conventional design with conventional adhesive coating | | |

It will seen that the many of the filter components in the above table are the same materials described in earlier examples, including the Epolight III-57 light absorbing filtering component of layer 6. Unless otherwise indicated, all of the filter components described in the earlier examples are prepared in the same manner described in such examples but with the addition of the several materials that are newly listed in the current example. These are the BASF Sudan Blue 670 material, the CK Interplast Red material, the BHT material, and the 3M W-210 Zeeospheres used in the light absorbing filter layer 6. Additional newly disclosed materials in this example are the FM Group 17923 Silk Frost ink of the light scattering filter layer 3, and the FM Group 8130191 Satin Frost pigment and Degussa Acematt HK 450 material of the light scattering filter layer 8.

The BASF Sudan Blue 670 material is an organic solvent-soluble blue dye used as a blue colorant in the light absorbing filter layer 6 (containing the Epolight III-57). It is produced by BASF Aktiengesellschaft of Mannheim, Germany. The CK Interplast Red material is another organic solvent-soluble red dye used as a red colorant in the light absorbing filter layer 6. It is produced by CK Colors, Inc. of Charlotte, N.C. The BHT material is butylatedhydroxytoluene preservative, which acts as an antioxidant in the light absorbing filter layer 6. The 3M W-210 Zeeospheres are light scattering ceramic spheres produced by 3M Corporation of St. Paul, Minn. They vary in size between about 1–12 microns. These spheres are also added to the light absorbing filter of layer 6 and decrease the amount of the Epolight III-57 absorber required therein due to their ability to scatter near Infrared light. This helps reduce the yellow tinting effect that the Epolight material has on the overall card. The 3M W-210 Zeeospheres also prevent the light absorbing filter layer 6 from being compressed during lamination. The FM Group 17923 Silk Frost ink and the 8130191 Satin Frost pigment that are respectively used in the light scattering filter layers 3 and 8 are light scatterers made by FM Group, Inc. of Sloatsburg, N.Y. These materials are sometimes referred to as "pearlescent" and have the ability to scatter or reflect light over a broad wavelength range. Thus, although they increase opacity in the near Infrared range, they also increase opacity relative to visible light. In addition to their light scattering properties, the FM Group materials help mask the light filtering layer 6, which has the yellow-tinted Epolight III-57 material therein that tends to color the overall card notwithstanding the presence of the BASF and CK colorants. The Degussa Acematt HK 450 material is a silica powder sold by Degussa-Huls Corporation of Ridgefield Park, N.J. This material is used as a processing additive to prevent sheet sticking, as is known in the art.

Cards produced in accordance with this example were translucent in the visible light range and had a soft whitish gray appearance. The measured near Infrared opacity at the least opaque location of the cards was about 1.6 (3% transmittance) at 950 nm and about 1.5 (3% transmittance) at 890 nm. In the visible light range, the opacity at the least opaque location on the cards was about 0.7 (20% transmittance), as measured by the X-Rite 361T Densitometer (see above) between 400–750 nm.

EXAMPLE 7

Cards produced in accordance with this example have all of the ten (10) layers shown in FIG. 8 and described above, with the exception of the light filtering coating layers 3 and 8, which were not used, thus yielding an eight (8) layer card. Note from Example 6 above that the missing layers 3 and 8 are the light scattering layers respectively containing the FM Group 17923 Silk Frost ink and the FM Group Satin Frost 8130191 pigment. On the other hand, the light absorbing filter layer 5 has been added back in, such that the cards of this example have two light absorbing filtering layers (layers 5 and 6). The specific materials and processing methods that were used to form the layers of the cards of this example are identified in the table below:

| Layer 1 | 1.8 mil clear vinyl film of conventional design. Matte finish applied during production lamination using conventional processing. | | |
|---|---|---|---|
| Layer 2 | Lithographic print pass | | |
| Layer 3 | No Layer 3 | | |
| Layer 4 | 13 mil clear vinyl sheet of conventional design | | |
| Layer 5 | Epolight III-57 | 15.00 g | Applied as a coating |
| | UV5411 | 5.00 g | with 305 mesh screen |
| | BHT | 5.00 g | |
| | 3M W-210 Zeeospheres | 130.00 g | |
| | Nazdar VF190 | 50.00 g | |
| | Nazdar 132688A | 795.00 g | |
| Layer 6 | Epolight III-57 | 15.00 g | Applied as a coating |
| | UV5411 | 5.00 g | with 305 mesh screen |
| | BHT | 5.00 g | |
| | 3M W-210 Zeeospheres | 130.00 g | |
| | Nazdar VF190 | 50.00 g | |
| | Nazdar 132688A | 795.00 g | |
| Layer 7 | 13 mil clear vinyl sheet of conventional design | | |
| Layer 8 | No Layer 8 | | |
| Layer 9 | Lithographic print pass | | |
| Layer 10 | 1.8 mil clear vinyl film of conventional design with conventional adhesive coating | | |

Note that the two light absorbing layers (layers 5 and 6) containing the light absorbing dye Epolight III-57 lack any added colorants. Cards produced in accordance with this example were transparent in the visible light range and had a strongly yellowish-slightly green appearance. The measured near Infrared opacity at the least opaque location of the cards was about 1.9 (1.3% transmittance) at 950 nm and about 1.4 (4% transmittance) at 890 nm. In the visible light range, the opacity at the least opaque location on the cards was about 0.2 (63% transmittance), as measured by the X-Rite 361T Densitometer (see above) between 400–750 nm.

EXAMPLE 8

Cards produced in accordance with this example have all of the ten (10) layers shown in FIG. 8 and described above, with the exception of the light filtering coating layers 3 and 8, which were not used, thus yielding an eight (8) layer card. Note from Example 6 above that the missing layers 3 and 8 are the light scattering layers containing the FM Group 17923 Silk Frost ink and the 8130191 pearlescent pigment. On the other hand, as in example 7, the light absorbing filter layer 5 has been added back in, such that the cards of this example have two light absorbing filtering layers (layers 5 and 6). The specific materials and processing methods that were used to form the layers of the cards of this example are identified in the table below:

| Layer 1 | 1.8 mil clear vinyl film of conventional design. Matte finish applied during production lamination using conventional processing. | | |
|---|---|---|---|
| Layer 2 | Lithographic print pass | | |
| Layer 3 | No Layer 3 | | |
| Layer 4 | 13 mil clear vinyl sheet of conventional design | | |
| Layer 5 | Epolight III-57 | 12.00 g | Applied as a coating |
| | BASF Sudan Blue 670 | 3.75 g | with 305 mesh screen |
| | CK Interplast Red | 2.75 g | |
| | UV5411 | 5.00 g | |
| | BHT | 5.00 g | |
| | 3M W-210 Zeeospheres | 130.00 g | |
| | Nazdar VF190 | 50.00 g | |
| | Nazdar 132688A | 791.50 g | |
| Layer 6 | Epolight III-57 | 12.00 g | Applied as a coating |
| | BASF Sudan Blue 670 | 3.75 g | with 305 mesh screen |
| | CK Interplast Red | 2.75 g | |
| | UV5411 | 5.00 g | |
| | BHT | 5.00 g | |
| | 3M W-210 Zeeospheres | 130.00 g | |
| | Nazdar VF190 | 50.00 g | |
| | Nazdar 132688A | 791.50 g | |
| Layer 7 | 13 mil clear vinyl sheet of conventional design | | |
| Layer 8 | No Layer 8 | | |
| Layer 9 | Lithographic print pass | | |
| Layer 10 | 1.8 mil clear vinyl film of conventional design with conventional adhesive coating | | |

Note that the two light absorbing layers (layers 5 and 6) containing the light absorbing dye Epolight III-57 have the blue and red colorants of example 6. Cards produced in accordance with this example were transparent in the visible light range and had a neutral dark gray appearance. The measured near Infrared opacity at the least opaque location of the cards was about 1.6 (3% transmittance) at 950 nm and about 1.1 (9% transmittance) at 890 nm. In the visible light range, the opacity at the least opaque location on the cards was about 0.5 (32% transmittance), as measured by the X-Rite 361T Densitometer (see above) between 400–750 nm.

EXAMPLE 9

Cards produced in accordance with this example have all of the ten (10) layers shown in FIG. 8 and described above. These layers include two light absorbing filter layers (layers 5 and 6) and two light scattering filter layers (layers 3 and 8) for a total of four filtering layers. The specific materials and processing methods that were used to form the layers of the cards of this example are identified in the table below:

| Layer 1 | 1.8 mil clear vinyl film of conventional design. Matte finish applied during production lamination using conventional processing. | | |
|---|---|---|---|
| Layer 2 | Lithographic print pass | | |
| Layer 3 | No Layer 3 | | |
| Layer 4 | 13 mil clear vinyl sheet of conventional design | | |
| Layer 5 | Epolight III-57 | 12.00 g | Applied as a coating |
| | Nazdar VF422 Reflex Blue | 20.00 g | with 305 mesh screen |
| | BASF Sudan Blue 670 | 3.75 g | |
| | CK Interplast Red | 2.75 g | |
| | UV5411 | 5.00 g | |
| | BHT | 5.00 g | |
| | 3M W-210 Zeeospheres | 130.00 g | |

-continued

| | | | |
|---|---|---|---|
| | Nazdar VF190 | 50.00 g | |
| | Nazdar 132688A | 771.50 g | |
| Layer 6 | Epolight III-57 | 12.00 g | Applied as a coating |
| | Nazdar VF422 Reflex Blue | 20.00 g | with 305 mesh screen |
| | BASF Sudan Blue 670 | 3.75 g | |
| | CK Interplast Red | 2.75 g | |
| | UV5411 | 5.00 g | |
| | BHT | 5.00 g | |
| | 3M W-210 Zeeospheres | 130.00 g | |
| | Nazdar VF190 | 50.00 g | |
| | Nazdar 132688A | 771.50 g | |
| Layer 7 | 13 mil clear vinyl sheet of conventional design | | |
| Layer 8 | No Layer 8 | | |
| Layer 9 | Lithographic print pass | | |
| Layer 10 | 1.8 mil clear vinyl film of conventional design with conventional adhesive coating | | |

Note that the two light absorbing layers 5 and 6 containing the light absorbing dye Epolight III-57 include the two colorants of example 6 as well as an additional colorant not seen in any of the previous examples. This is the Nazdar VF422 Reflex Blue liquid colorant (comprising resin and pigment) from Nazdar Corporation. This colorant is an organic solvent-soluble dye having a blue tint. It will also be seen that the two light scattering layers 3 and 8 use a different light scattering material than seen in previous examples. This is the EM Industries Afflair 225 Rutile Blue Pearl material from EM Industries, Inc., Chemicals and Pigment Division, of Hawthorne, N.Y. This material a powdered pigment that is pearlescent in nature.

Cards produced in accordance with this example were translucent in the visible light range and had a bluish appearance. The measured near Infrared opacity at the least opaque location of the cards was about 1.8 (2% transmittance) at 950 nm and about 1.3 (5% transmittance) at 890 nm. In the visible light range, the opacity at the least opaque location on the cards was about 0.6 (25% transmittance), as measured by the X-Rite 361T Densitometer (see above) between 400–750 nm.

Accordingly, a financial transaction card that is transparent or translucent to human viewing yet detectable by automated card processing equipment has been disclosed. While various embodiments have been shown and described, it should be apparent that many variations and alternative embodiments would be apparent to those skilled in the art in view of the teachings herein. For example, although specific automated card processing equipment with characteristic source/detector wavelength and opacity requirements are described, it will be appreciated that the concepts of the present invention can be applied to financial transaction cards used in other equipment having different wavelength and opacity requirements. In addition, although specific filter constructions are described it will be appreciated that many other filter designs may be utilized to achieve successful implementation of the invention. It will be understood, therefore, that the invention is not to be in any way limited except in accordance with the spirit of the appended claims and their equivalents.

What is claimed is:

1. A financial transaction card that is transparent or translucent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted from said source to said detector due to the presence of said card, comprising:
   a substantially planar material sheet having upper and lower surfaces bounded by a continuous peripheral edge;
   said material sheet being transparent or translucent to human viewing; and
   a near Infrared light filter covering one of said upper or lower surfaces of said material sheet, said filter providing sufficient card opacity relative to one or more near Infrared light wavelengths to render said card detectable by said source/detector pairs by blocking near Infrared light emitted by said source from reaching said detector, thereby triggering detection of said card, while still allowing said card to remain transparent or translucent to visible light.

2. A financial transaction card in accordance with claim 1 wherein said filter comprises a light scattering material.

3. A financial transaction card in accordance with claim 1 wherein said filter is formed as a filter coating, film or deposition applied or secured to said material sheet.

4. A financial transaction card in accordance with claim 3 wherein said filter is a clear, light absorbing material providing the requisite light filtering properties.

5. A financial transaction card is accordance with claim 1 wherein said filter is formed from a light filtering material disbursed through all or a portion of said material sheet.

6. A method for manufacturing a financial transaction card that is transparent or translucent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted from said source to said detector due to the presence of said card, comprising the steps of:
   forming a substantially planar material sheet having upper and lower surfaces bounded by a continuous peripheral edge;
   said material sheet being transparent or translucent to human viewing; and
   covering one of said upper or lower surfaces of said material sheet with a near Infrared filter, said filter providing sufficient card opacity relative to one or more near Infrared wavelengths to render said card detectable by said source/detector pairs by blocking near Infrared light emitted by said source from reaching said detector, thereby triggering detection of said card, while still allowing said card to remain transparent or translucent to visible light.

7. A method in accordance with claim 6 wherein said filter comprises a light scattering material.

8. A method in accordance with claim 6 wherein said filter is formed as a filter coating, film or deposition applied or secured to said material sheet.

9. A method in accordance with claim 8 wherein said filter is formed from a clear light absorbing material providing the requisite light filtering properties.

10. A method in accordance with claim 6 wherein said filter is formed from a light filtering material disbursed through all or a portion of said material sheet.

11. A financial transaction card that is transparent or translucent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted from said source to said detector due to the presence of said card, comprising:
- a sheet of material that is transparent or translucent to human viewing; and
- a near Infrared light filter applied to said material sheet, said filter comprising a dye and a colorant, and providing sufficient card opacity relative to one or more near Infrared light wavelengths to render said card detectable by said source/detector pairs by blocking near Infrared light emitted by said source from reaching said detector, thereby triggering detection of said card, while still allowing said card to remain transparent or translucent to visible light.

12. A financial transaction card in accordance with claim 11 wherein said filter is applied to said material sheet as a liquid coating.

13. A financial transaction card in accordance with claim 12 wherein said filter is made from a light absorbing dye material dissolved in a liquid coating material at a dye-to-coating weight ratio of between about 0.2–5.0%.

14. A financial transaction card in accordance with claim 12 wherein said liquid coating comprises a plastic resin-based coating material.

15. A financial transaction card in accordance with claim 12 wherein said liquid coating is applied to said material by screen printing.

16. A financial transaction card in accordance with claim 11 wherein said filter comprises a light scattering material.

17. A financial transaction card in accordance with claim 11 wherein said filter is formed as a filter coating, film or deposition or secured to said material sheet.

18. A financial transaction card in accordance with claim 17 wherein said filter is a clear, light absorbing material providing the requisite light filtering properties.

19. A financial transaction card in accordance with claim 11 wherein said filter is formed from a light filtering material disbursed through all or a portion of said material sheet.

20. A financial transaction card in accordance with claim 11 wherein said filter is located on said card so that near Infrared light is filtered over all regions of said card.

* * * * *